United States Patent
Liu et al.

(10) Patent No.: US 11,405,835 B2
(45) Date of Patent: Aug. 2, 2022

(54) MOBILITY MANAGEMENT IN WIRELESS NETWORKS

(71) Applicant: ZTE Corporation, Guangdong (CN)

(72) Inventors: Jing Liu, Guangdong (CN); Zijiang Ma, Guangdong (CN); Xiaojuan Shi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 181 days.

(21) Appl. No.: 16/828,922

(22) Filed: Mar. 24, 2020

(65) Prior Publication Data

US 2020/0229056 A1    Jul. 16, 2020

Related U.S. Application Data

(63) Continuation of application No. PCT/CN2017/104074, filed on Sep. 28, 2017.

(51) Int. Cl.
| | |
|---|---|
| *H04W 4/00* | (2018.01) |
| *H04W 36/08* | (2009.01) |
| *H04W 36/00* | (2009.01) |
| *H04W 48/20* | (2009.01) |

(52) U.S. Cl.
CPC ........ *H04W 36/08* (2013.01); *H04W 36/0011* (2013.01); *H04W 48/20* (2013.01)

(58) Field of Classification Search
CPC combination set(s) only.
See application file for complete search history.

(56) References Cited

U.S. PATENT DOCUMENTS

| | | | |
|---|---|---|---|
| 9,775,188 | B2 | 9/2017 | Kim |
| 2003/0189909 | A1 | 10/2003 | Chao et al. |
| 2011/0305220 | A1 | 12/2011 | Lindoff et al. |
| 2016/0014628 | A1 | 1/2016 | Kim |
| 2016/0135103 | A1 | 5/2016 | Lee et al. |
| 2017/0134998 | A1 | 5/2017 | Xu et al. |
| 2017/0195935 | A1* | 7/2017 | Xu .................... H04W 36/0055 |

(Continued)

FOREIGN PATENT DOCUMENTS

| | | |
|---|---|---|
| CN | 105050124 A | 11/2015 |
| CN | 105992292 A | 10/2016 |

(Continued)

OTHER PUBLICATIONS

Notification to Grant Patent Right for Invention for Chinese Patent Application No. 201780095485.9, dated Sep. 8, 2021 (6 pages).

(Continued)

*Primary Examiner* — Justin Y Lee
(74) *Attorney, Agent, or Firm* — Perkins Coie LLP

(57) ABSTRACT

A method for wireless communications includes operating a first network element in a wireless communication network to provide connectivity between a first core network and a user device, wherein the wireless communication network includes a second network element that is configured to provide a secondary connectivity between the first core network and the user device, and communicating, by the first network element, in a handover to a third network element configured to provide connectivity with a second core network, configuration information of the second network element to the third network element.

18 Claims, 11 Drawing Sheets

(56) References Cited

U.S. PATENT DOCUMENTS

2020/0128452 A1* 4/2020 Centonza .......... H04W 36/0044
2020/0205042 A1* 6/2020 Ryu ................ H04W 36/00

FOREIGN PATENT DOCUMENTS

| | | |
|---|---|---|
| CN | 106063328 A | 10/2016 |
| CN | 106162771 A | 11/2016 |
| CN | 106535269 A | 3/2017 |
| CN | 106559916 A | 4/2017 |
| CN | 106559920 A | 4/2017 |
| CN | 106604330 A | 4/2017 |
| CN | 106686607 A | 5/2017 |
| CN | 106792938 A | 5/2017 |
| CN | 107005907 A | 8/2017 |
| CN | 107113670 A | 8/2017 |
| CN | 107113904 A | 8/2017 |
| CN | 107154840 A | 9/2017 |
| JP | 2017-505056 A | 2/2017 |
| WO | 2013006384 A1 | 1/2013 |
| WO | 2015009075 A1 | 1/2015 |
| WO | 2015/115033 A1 | 8/2015 |
| WO | 2016/163544 A1 | 10/2016 |
| WO | 2017054538 A1 | 4/2017 |

OTHER PUBLICATIONS

Office Action for Chinese Patent Application No. 201780095485.9, dated Nov. 2, 2020 (20 pages).
Office Action for Korean Patent Application No. 10-2020-7012184, dated Feb. 22, 2021 (10 pages).
LG Electronics Inc., "Inter-RAT Mobility with Dual Connectivity in NR," 3GPP TSG-RAN WG2 Meeting #95, Gothenburg, Sweden, R2-165660, Aug. 2016.
Extended European Search Report for European Patent Application No. 17926437.9, dated Sep. 14, 2020.
"Technical Specification Group Radio Access Network; Evolved Universal Terrestrial Radio Access (E-UTRA) and NR; Multi-connectivity; Stage 2," 3GPP TS 37.340, V1.0.0, Release 15, Sep. 2017.
"Technical Specification Group Services and System Aspects; Procedures for the 5G System, Stage 2," 3GPP TS 23.502 V1.2.0, Release 15, Sep. 2017.
NTT Docomo, Inc., "Inter Master Node handover with Secondary Node change," 3GPP TSG-RAN2#99, Bedin, Germany, R2-1709403, Aug. 2017.
Sony, "Handover involving 5GC and EPC," 3GPP TSG RAN WG2 Meeting #99, Berlin, Germany, R2-1709516, Aug. 2017.
International Search Report and Written Opinion dated Jul. 4, 2018 for International Application No. PCT/CN2017/104074, filed on Sep. 28, 2017 (8 pages).
Office Action for Japanese Patent Application No. 2020-517786, dated Jun. 22, 2021, 6 pages.
Office Action for Japanese Patent Application No. 2020-517786, dated Feb. 22, 2022 (8 pages).

* cited by examiner

MOBILITY MANAGEMENT IN WIRELESS NETWORKS

CROSS REFERENCE TO RELATED APPLICATIONS

This patent document is a continuation of and claims benefit of priority to International Patent Application No. PCT/CN2017/104074, filed on Sep. 28, 2017. The entire content of the before-mentioned patent application is incorporated by reference as part of the disclosure of this application.

TECHNICAL FIELD

This document relates to systems, devices and techniques for wireless communications.

BACKGROUND

Efforts are currently underway to define next generation wireless communication networks that provide greater deployment flexibility, support for a multitude of devices and services and different technologies for efficient bandwidth utilization. For better bandwidth utilizations, various techniques, including new ways to provide higher quality of service, are being discussed.

SUMMARY

This document describes technologies, among other things, for providing master and secondary base station support to user devices during movement from one cell to another.

In one exemplary aspect, a method for wireless communications is disclosed. The method includes operating a first network element in a wireless communication network to provide connectivity between a first core network and a user device, wherein the wireless communication network includes a second network element that is configured to provide a secondary connectivity between the first core network and the user device; and communicating, by the first network element, in a handover to a third network element configured to provide connectivity with a second core network, configuration information of the second network element to the third network element.

In some embodiments, the first core network and the second core network are the same core network. In some embodiments, the first core network and the second core network are different core networks.

In some embodiments, the first network element and the third network element operate using a first radio access technology (RAT). The first RAT may be a fourth generation (4G) RAT technology. The first RAT may also be a fifth generation (5G) RAT technology.

In some embodiments, the second network element and the fourth network element operating using a second RAT. In some implementations, the first RAT and the second RAT correspond to different protocol standards. In some implementations, the first RAT and the second RAT correspond to a same protocol standard.

In some embodiments, the configuration information of the second network element is communicated using a data structure from one of the following: a container, a container and multiple explicit information elements, multiple containers, or multiple containers and multiple explicit information elements.

In another exemplary aspect, a method for wireless communications is disclosed. The method includes operating a first network element to provide connectivity to a first core network; receiving, when a user device is handed over from a second network element, information from the second network element providing connectivity to a second core network, wherein the information identifies properties of a third network element providing a secondary connectivity to the second core network; and selectively deciding, based on the information, a secondary connectivity network element between the third network element and a fourth network element for the first network element, wherein the fourth network element is configured to provide connectivity to the first core network.

In some embodiments, the method also includes, for a newly selected fourth network element, transmitting the information of the third network element to the fourth network element. The information of the third network element may be transmitted using a data structure from one of the following: a container, a container and multiple explicit information elements, multiple containers, or multiple containers and multiple explicit information elements.

In some embodiments, the first core network and the second core network are the same core network. In some embodiments, the first core network and the second core network are different core networks.

In some embodiments, the second network element and the third network element operate using a first radio access technology (RAT). The first RAT may be a fourth generation (4G) RAT technology. The first RAT may be a fifth generation (5G) RAT technology.

In some embodiments, the first network element and the fourth network element operating using a second RAT. In some implementations, the first RAT and the second RAT correspond to different protocol standards. In some implementations, the first RAT and the second RAT correspond to a same protocol standard.

In some embodiments, the information from the second network element is included in a data structure from one of the following: a container, a container and multiple explicit information elements, multiple containers, or multiple containers and multiple explicit information elements. In some embodiments, the above described data structure may also include some or all configuration information of the first network element.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
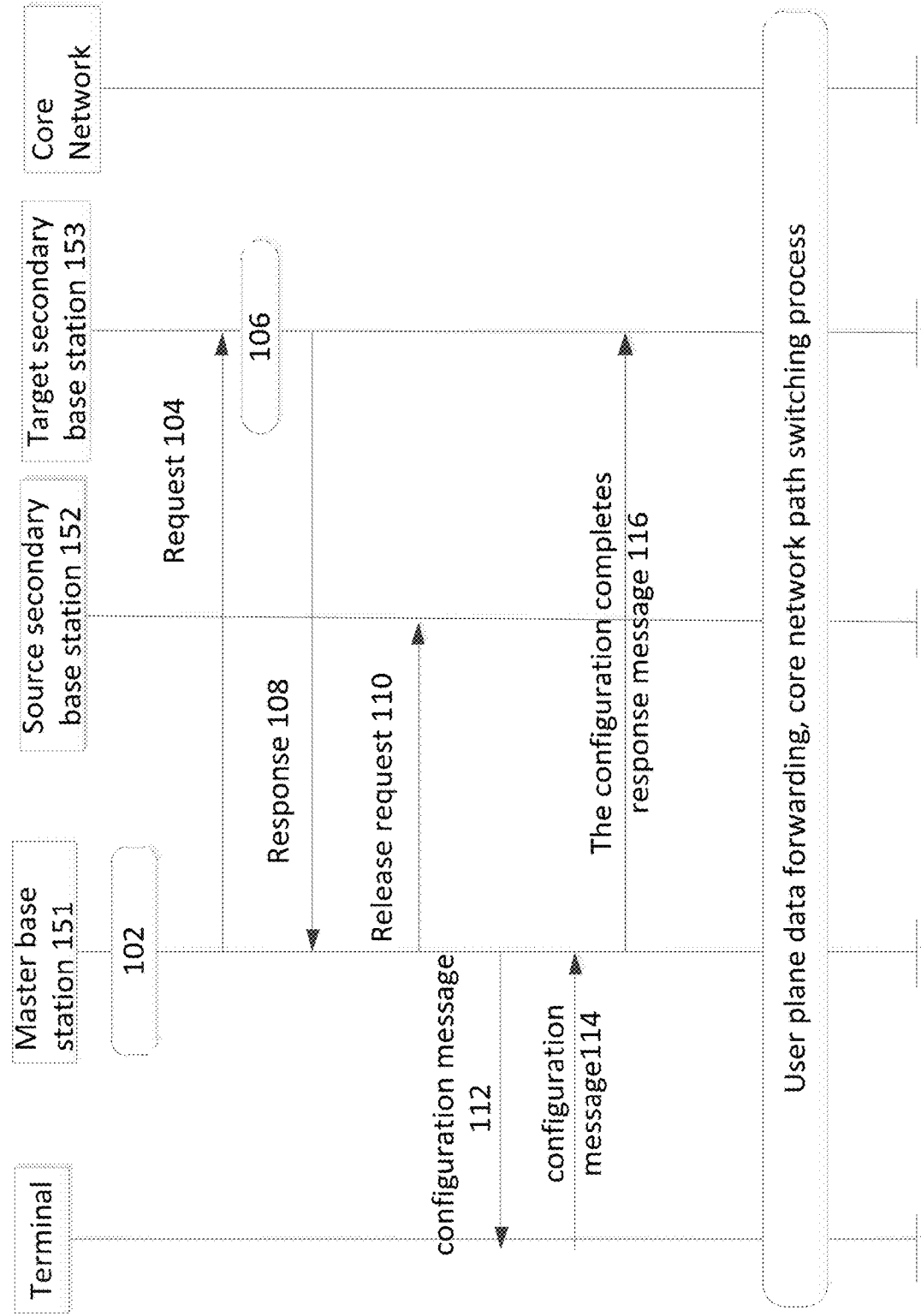
FIG. 1 shows an example of a signaling flow for a change of the secondary base stations in the LTE systems.

The following abbreviations are used in the present document.
MeNB Master eNB
SeNB Secondary eNB
MgNB Master gNB
SgNB Secondary gNB
MN Master Node
SN Secondary Node
PCell Primary Cell
PSCell Primary Secondary Cell
Scell Secondary Cell Cellular mobile communication systems have evolved over the years. After several decades of development, the current fourth generation (4G, 4th Generation) mobile communication systems have a wide variety of applications. To meet the increased demand for bandwidth, the fifth generation (5G, 5th Generation) mobile communication architecture is being developed to provide higher throughput, lower latency, and greater user volume of diversified business services. For 4G systems, such as the Long Term Evolution (LTE) systems, the base station is referred to as eNB (E-UTRAN NodeB), the core network is referred to as EPC (Evolved Packet Core). In the 5G architecture, the base station is referred to as gNB (Global NodeB), and the core network is referred to as 5GC (5G Generation Core).

In order to ensure that, in the future, operators can smoothly evolve from 4G mobile communication systems to 5G mobile communication systems in network deployments, in the initial stage of 5G research, a 4G/5G dual connectivity solution is proposed, which uses both 4G and 5G base stations (dual connectivity, also referred to as DC). In dual connectivity communication, the core network types for the connections and the types of master and secondary base stations are different. The possible combinations can be divided into a variety of 4G/5G dual-link networking scenarios, such as:

1) a 4G master base station and a 5G secondary base station, connected concurrently to a 4G core network, 2) a 5G master base station and a 4G secondary base station, connected concurrently to a 5G core network, and 3) a 4G master base station and a 5G secondary base station, connected concurrently to a 5G core network.

Furthermore, in 5G mobile communication systems, in order to ensure that 5G users may receive high bandwidth connectivity, 5G base stations within a 5G core network are used for dual connectivity (i.e., both the master base station and the secondary base station are 5G base stations).

In the present document, the primary base station is collectively referred to as MN, Master Node (MN), or Master Cell Group (MCG). The secondary base station is collectively referred to as Secondary node (SN), or Secondary Cell Group (SCG).

Due to the mobility of a user device or a terminal, in the above-mentioned dual connectivity scenarios, the terminal may perform the site update once the terminal is moved out of the coverage of the current master or secondary base stations. In the traditional technology LTE systems, the following ways of changing the master or secondary base stations are supported:

1. In the case of dual connectivity, the master base station changes, but the secondary base station remains unchanged. This case may also be referred to as inter-MeNB handover without SeNB change.

2. In the case of dual connectivity, the secondary base station changes, but the master base station remains unchanged. This case may also be referred to as change of SeNB.

3. In the case of dual connectivity, the master base station changes, and the secondary base station gets removed. This case may also be referred to as MeNB to eNB change.

4. In the case of single connectivity (e.g., without a secondary base station), the master base station changes, and a secondary base station is added. This case may also be referred to as eNB to MeNB change.

In the dual connectivity scenarios in the LTE systems, when the secondary base station is triggered to change (e.g., change of SeNB), the process can only be initiated by the master base station. FIG. 1 shows an example of a signaling flow for a change of a secondary base station in the LTE systems.

At 102, the master base station 151 triggers a change of the secondary base station.

At 104, the master base station 151 sends a request to a target secondary base station 153 for the change. The request may include configuration information of the master base station 151 and the source secondary base station 152. The request may also include service related information for the target secondary base station 153.

At 106, the target secondary base station 153 receives the request and establishes corresponding configuration in the target secondary base station 153 based on the received request. The target secondary base station 153 then compares the configuration information between the source secondary base station 152 and the target secondary base station 153. The target secondary base station 153 generates supplemental configuration information, which represents the delta between the configuration information of the source secondary base station 152 and the configuration information of the target secondary base station 153, based on the comparison.

At 108, the target secondary base station 153 transmits a response to the master base station 151. The response may include the generated supplemental configuration information.

At 110, the master base station 151 then sends a release request to the source secondary base station 152.

At 112, the master base station 151 transmits an air interface configuration message to the terminal with the supplemental configuration information of the target secondary base station 153 and other configuration information of the source master base station 151.

At 114, the terminal performs configuration based on the message from the master base station 151, and transmits another message to confirm the configuration.

At 116, the master base station 151 transmits a response to the target secondary base station 153 to notify that the configuration has completed.

Unlike the 5G dual connectivity and the 4G/5G dual connectivity, in the dual connectivity of the LTE systems, the master base station always stores the latest wireless configuration information of the secondary base station because the air interface configuration can only be performed by the master base station. In order to obtain the supplemental configuration of the wireless parameters of the terminal, the request sent from the master base station to the new target secondary base station (i.e., SN addition request) can carry all the wireless configuration information of the current secondary base station (i.e., the source secondary base station) to assist the target secondary station adjust its configuration, so as to avoid reset and/or re-establishment of the user plane, MAC, and other relevant information and to avoid packet loss to ensure good user experiences.

One technical problem in the traditional LTE systems with dual connectivity is that such a system does not support simultaneous changing of the master base station and the secondary base station. Due to this limitation, when the master base station changes, the secondary base station remains unchanged. In order to have a different secondary base station, a terminal needs to first delete the old secondary base station, and then triggers an addition of a new secondary base station independently. Therefore, for 5G dual connectivity or 4G/5G dual connectivity, a two-step process is needed when the master and secondary base stations need to change at the same time: (1) to delete the old secondary base station, and (2) to add the new secondary base station. This two-step process may adversely affect user data throughput and user experience during mobility.

Furthermore, the current LTE technology does not provide a solution for transmitting configuration information of the old secondary base station (i.e., source) to the new secondary base station (i.e., target), especially for the 4G/5G dual connectivity scenarios. Since the wireless base stations belong to different mobile communication systems in the 4G/5G dual connectivity scenarios, there are differences between the air interface specifications. Moreover, in 4G/5G dual connectivity, the mater base station and the secondary base station belong to different radio access technology, which cannot comprehend each other's code logic, and may have separate air interface configuration or reconfiguration mechanism, and the partial configuration or reconfiguration process triggered by the secondary base station is invisible to the master base station. Therefore, the master base station cannot obtain the complete configuration information from the secondary base station. During simultaneous change of the master and secondary base stations, the new secondary base station cannot obtain the configuration information of the old secondary base station. The new secondary base station thus cannot support the supplemental configuration information for the terminal. A full configuration of the air interface may be required, which may result in user data packet loss and thereby affects user experiences.

The present document provides techniques that can be applied for a dual connectivity in which the terminal is connected to the master base station and the secondary base station at the same time. When a terminal switches its master and secondary base stations, both base stations can be switched at the same time (also referred to as Inter-Master Node handover with Secondary Node change). That is, the terminal switches from a source dual-link master and secondary base stations to a target dual-link master and secondary base stations.

Figure 7:
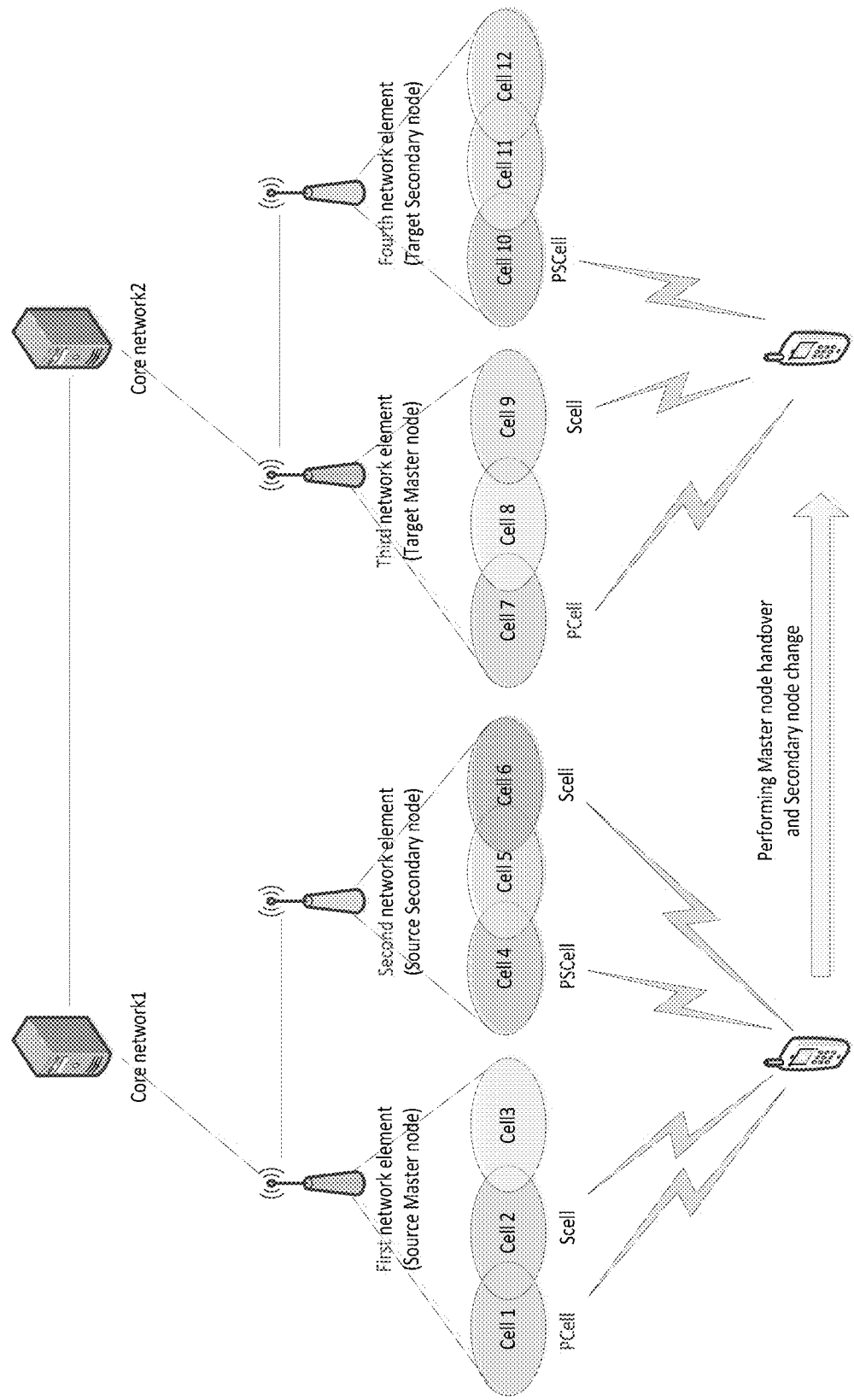
FIG. 7 shows a schematic diagram of an exemplary configuration of core networks and network elements.

In the description below, the source master base station is defined as a first network element, the source secondary base station is defined as a second network element, the target master base station is defined as a third network element, the target secondary base station is defined as a fourth network element, and the core network is defined as the fifth network element. FIG. 7 shows a schematic diagram of an exemplary configuration of core networks and network elements.

The techniques provide a method and an apparatus for configuring information between the source and target dual-link master and secondary base stations to solve the problem that the target secondary base station cannot obtain the complete configuration information of the source secondary base station.

Figure 2:
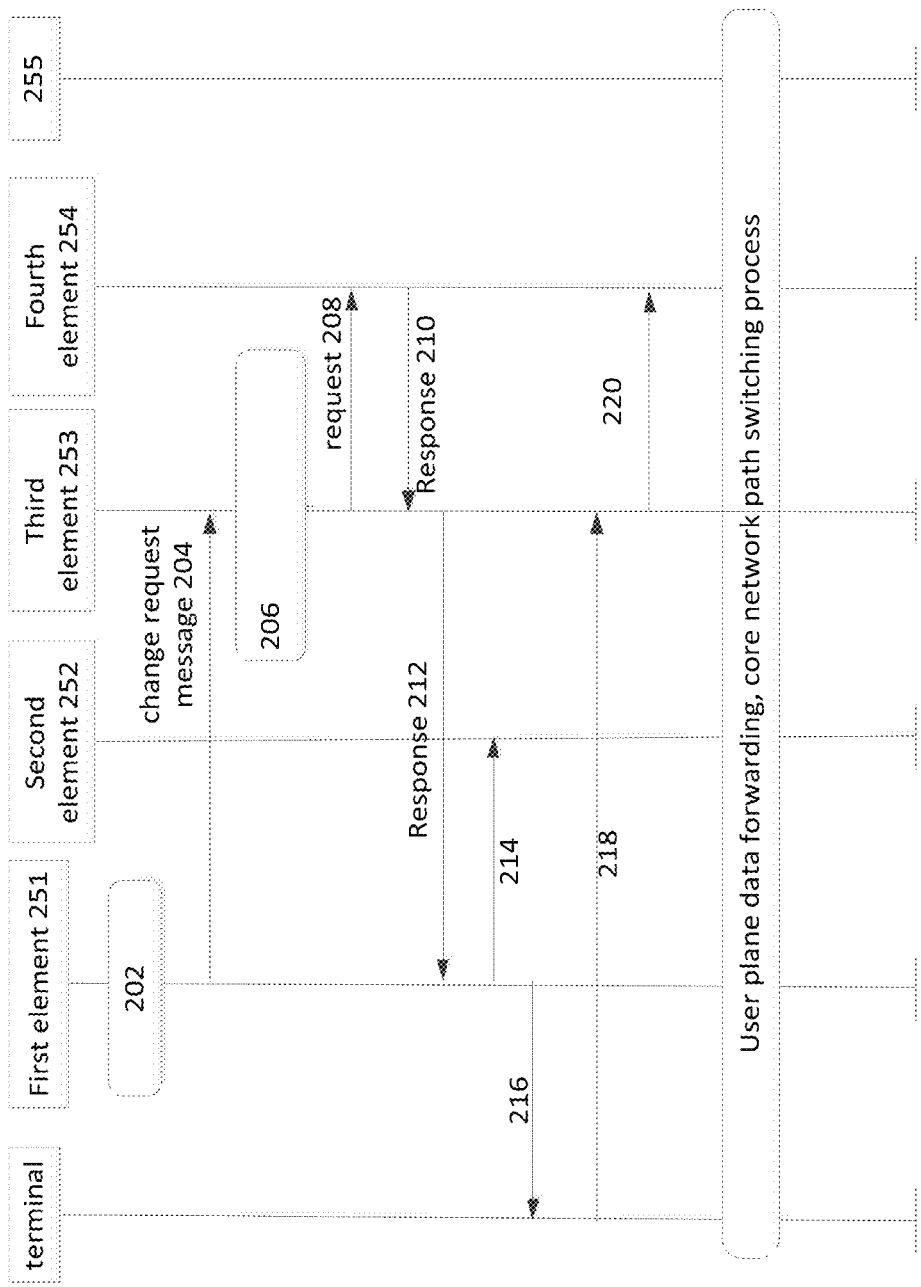
FIG. 2 shows an example of a signaling flow of a handover of a terminal from a first network element to a third network element.

FIG. 2 shows an example of a signaling flow of a handover of a terminal from a first network element to a third network element with a change from a second network element to a fourth network element. In FIG. 2, the terminal is connected to the first network element 251 and the second network element 252. The first network element 251 first obtains relevant information of the second network element 252. The first network element 251 may obtain the relevant information by sending a message to the second network element 252 to request for such information and receiving a response from the second network element 252 that includes the relevant information. In some embodiments, the second network element 252 may send the information to the first network element when the information changes. The relevant information of the second network element 252 may be in a data structure one of the following forms: one container, one container and explicit information elements, multiple containers, or multiple containers and explicit information elements. A container can be a transparent container, such as a Source To Target Transparent Container or a Target to Source Transparent Container used in current LTE systems. Each container may include multiple information elements for parameter configurations. The use of container(s) ensures that only the target node can decode the information included in the container. The use of explicit information element(s), on the other hand, allow both the target node and the intermediate relay node(s) to decode and/or modify the information included therein. The data structure may also include configuration information, some or all, of the first network element.

The relevant information of the second network element 252 includes but is not limited to the configuration information of the primary cell and the secondary cell(s) under the second network element 252 and relevant measurement information provided by the second network element 252. In some embodiments, a secondary cell under the second network element 252 is a secondary cell under the second base station in carrier aggregation (CA) scenarios. In some implementations, the number of the secondary cells is greater than or equal to 0.

In some embodiments, the configuration information of the primary cell under the second network element 252 includes at least one of the following: carrier configuration information, user plane configuration information, physical resource common configuration information, physical resource specific configuration information, MAC layer configuration, measurement configuration, and measurement results.

The configuration information of the secondary cell under the second network element 252 includes at least one of the following information: carrier configuration information, user plane configuration information, physical resource common configuration information, physical resource specific configuration information, MAC layer configuration information, measurement configuration, and measurement results.

At 202, the first network element 251 initiates the terminal to hand over to the third network element 253. The first network element 251 sends, at 204, a request to the third network element 253 and transmits the relevant information of the second network element 252 together with the relevant information of the first network element 251 to the third network element 253. The first network element 251 may transmit the relevant information directly to the third network element 253. In some embodiments, the first network element 251 transmits the relevant information to the fifth network element 255 first, and then the information is indirectly transmitted from the fifth network element 255 to the third network element 253. The relevant information of the second network element 252 and the relevant information of the first network element 251 may be in a data structure in one of the following forms: one container, one container and explicit information elements, multiple containers, or multiple containers and explicit information elements. The data structure may also include at least some configuration information of the first network element.

The third network element 253 obtains the relevant information of the second network element 252 and the relevant information of the first network element 251 and determines, at 206, whether to change the second network element 252 to the fourth network element 254. If the third network element 253 determines so, it transmits, at 208, the relevant information of the second network element 252 to the fourth network element 254. The relevant information of the second network element may be in a data structure in one of the following forms: one container, one container and explicit information elements, multiple containers, or multiple containers and explicit information elements. The data structure may also include at least some configuration information of the first network element.

In some embodiments, the third network element 253 may determine whether or not to perform the change based on the obtained measurement information. The measurement information obtained by the third network element 253 may include: the measurement information provided by the first network element 251, and/or the measurement information provided by the second network element 252. The received measurement information may be in a data structure one of the following forms: one container, one container and explicit information elements, multiple containers, or multiple containers and explicit information elements. The data structure may also include at least some configuration of the first network element.

In some embodiments, the third network element 253 obtains the measurement information provided by the first network element 251 by direct transmission of the information from the first network element 251 to the third network element 253. Alternatively, the information can be transmitted to the fifth network element 255 from the first network element 251, and the information is indirectly transmitted to the third network element 253 by the fifth network element 255.

In some embodiments, the third network element 253 obtains the measurement information provided by the second network element 252 using the following steps: (1) the first network element 251 obtains the relevant information of the second network element 252, and (2) the first network element 251 transmits the information directly to the third network element 253. Alternatively, the third network element 253 may obtain the measurement information using the following steps: (1) the first network element 251 obtains the relevant information of the second network element 252, (2) the first network element 251 transmits the information to the fifth network element 255, and (3) the fifth network element 255 indirectly transmits the information to the third network element 253. In each information transmission, the measurement information are may be in a data structure one of the following forms: one container, one container and explicit information elements, multiple containers, or multiple containers and explicit information elements. The data structure may also include at least some configuration information of the first network element.

In some embodiments, the third network element 253 may pass the obtained relevant information of the second network element 252 and/or measurement information to the fourth network element 254 for the fourth network element 254 to perform primary cell selection. The relevant information and measurement information may be in a data structure in one of the following forms: one container, one container and explicit information elements, multiple containers, or multiple containers and explicit information elements. Furthermore, after receiving the relevant information of the second network element 252, the fourth network element 254 may generate supplemental configuration information based on the received information, the radio resource configuration information, the measurement configuration information, etc. The fourth network element 254 can transmit, at 210, the supplemental configuration information to the third network element 253. The third network element 253 may further transmit, at 212, the supplemental configuration information of the fourth network element 254 along with other types of information that the third network element 253 has generated to the first network element 251. The data structure may also include at least some or all configuration information of the first network element.

In some embodiments, the third network element 253 may transmit directly to the first network element 251. In some implementations, the third network element 253 transmits the information to the fifth network element 255, and the information is indirectly transmitted to the first network element 251 by the fifth network element 255.

At 214, the first network element 251 sends a release request to the second network element 252.

At 216, the first network element 251 transmits an air interface configuration message to the terminal to forward the relevant configuration information to the terminal.

At 218, the terminal performs configuration based on the message from the first network element 251, and transmits another message to the third network element 253 to establish the connection.

At 220, the third network element 253 sends a confirmation message to the fourth network element 254 to confirm the new connection.

The above mentioned methods are further explained in the following embodiments.

Exemplary Embodiment 1

Figure 3:
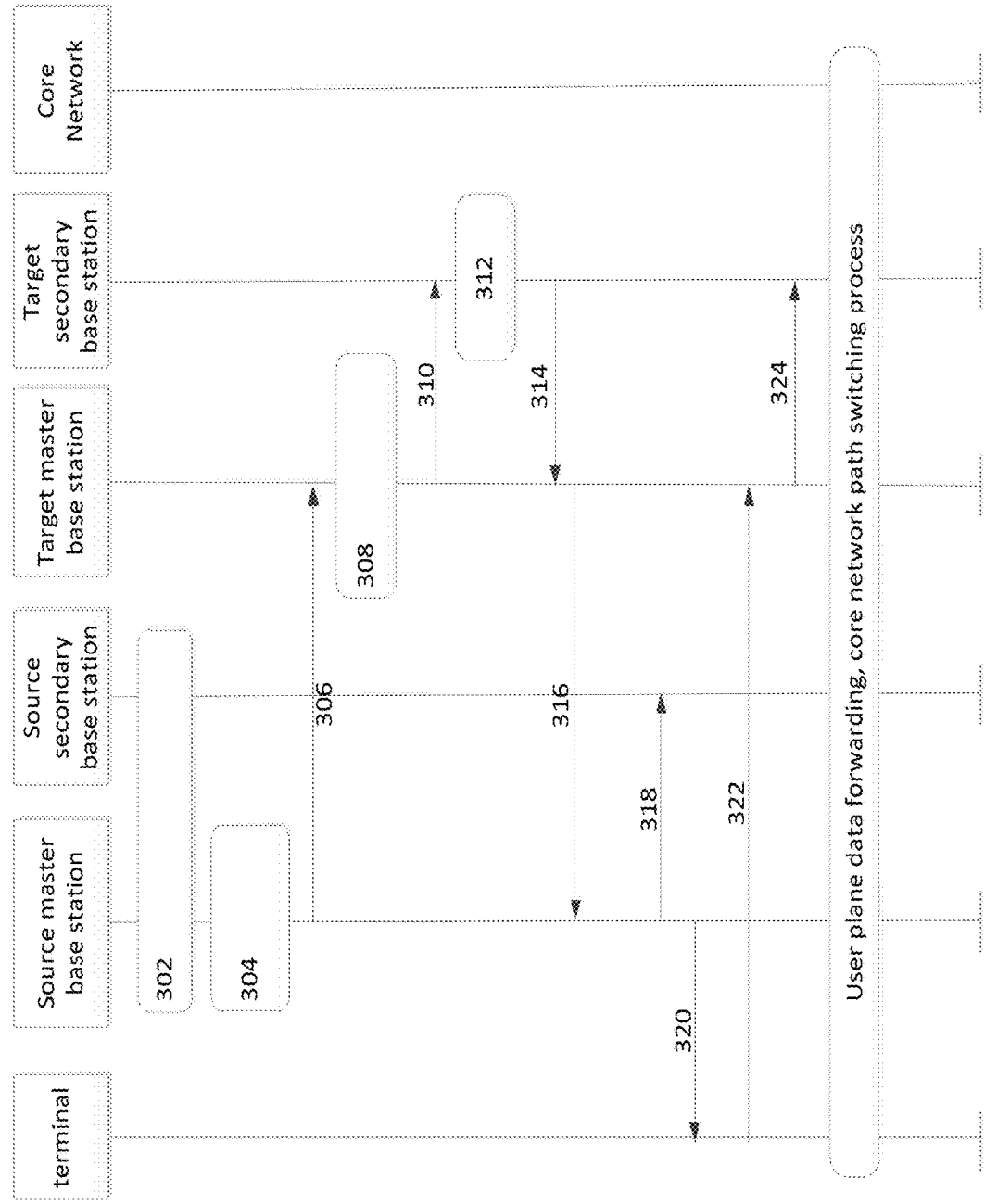
FIG. 3 shows an exemplary change of master base stations that is triggered through a direct interface.

FIG. 3 shows an exemplary change of master base stations that is triggered through a direct interface between a source master base station and a target master base station.

Step 1: The source master base station obtains, at 302, the configuration information of the source secondary base station. The source master base station can obtain the information by sending a message to the source secondary base station. Alternatively, the source secondary base station may send the information to the source master base station when its information changes. The obtained information of the source secondary base station may be in a data structure in one of the following forms: one container, one container and explicit information elements, multiple containers, or multiple containers and explicit information elements.

Step 2: The source master base station determines, at 304, to trigger a change of base stations. The source master base station transmits, at 306, a change request to the target master base station. The change request may include the configuration information of the source master base station. The change request may also include the configuration information of the source secondary base station obtained previously.

In some embodiments, the message may be a handover request message. The information of the source base station and the information of the source secondary base station may be in a data structure one of the following forms: one container, one container and explicit information elements, multiple containers, or multiple containers and explicit information elements. The configuration information of the secondary base stations includes configuration information of the primary cell (PSCell) and the secondary cell (SCell) under the secondary base station.

In some embodiments, the secondary cell of a secondary base station is a secondary cell under the Carrier Aggregation (CA) scenario on the secondary base station. The number of the secondary cells is equal to or greater than 0.

In some embodiments, the configuration information of the primary cell includes one or more of the following: carrier configuration information, user plane configuration information, physical resource common configuration information, physical resource specific configuration information, MAC layer configuration information, measurement configuration information, and measurement results.

In some embodiments, the configuration information of the secondary cell includes one or more of the following: carrier configuration information, user plane configuration information, physical resource common configuration information, physical resource specific configuration information, MAC layer configuration information, measurement configuration information, and measurement results.

Step 3: After the target master base station receives the configuration information, it determines, at 308, whether a change of the secondary base station is necessary. If the target master base station determines so, it sends, at 310, a request to a target secondary base station. The request may include the configuration information of target master node. The request may also include the service information and the configuration information of the source secondary base station.

In some embodiments, the request sent by the target master base station is an SN addition request message. In some implementations, the configuration information of target master node and the configuration information of the source secondary base station may be in a data structure in one of the following forms: one container, one container and explicit information elements, multiple containers, or multiple containers and explicit information elements.

Step 4: After receiving the request from the target master base station, the target secondary base station performs, at 312, resource allocations based on the service information in the message. The target secondary base station may compare the configuration information between the target secondary base station and the source secondary base station to generate supplemental configuration information for the target secondary base station.

Step 5: The target secondary base station transmits, at 314, the supplemental configuration information to the target master base station via a response message, indicating that resource allocations are successful for the target secondary base station.

In some embodiments, the response message is an SN addition request acknowledge message. In some implementations, the supplemental configuration information may be in a data structure in one of the following forms: one container, or one container and explicit information elements, or more than one container, or more than one container and explicit information elements.

Step 6: After receiving the response message, the target master base station transmits, at 316, the configuration information of the target master base station and/or the supplemental configuration information of the target secondary base station to the source master base station via a response message.

In some embodiments, the response message may be a handover request acknowledge message. The configuration information of the target master base station and/or the supplemental configuration information of the target secondary base station may be in one of the following forms in the response message: one container, one container and explicit information elements, multiple containers, or multiple containers and explicit information elements.

Step 7: After receiving the response message, the source master base station sends, at 318, a release request message to the source secondary base station to inform the source secondary base station to release resources.

Step 8: The source master base station also transmits, at 320, an air interface configuration message to the terminal to forward the relevant configuration information to the terminal.

Step 9: After the terminal completes the air interface configuration, the random access procedure of the target master station and the target secondary base station is started and the air interface configuration success message is sent, at 322, to the target master base station.

Step 10: After receiving the response at the target master base station at 324, the target master base station notifies the target secondary base station of the new connection.

Step 11: The network performs user data back-propagation and corresponding core-side upper-layer switching process.

Exemplary Embodiment 2

Figure 4:
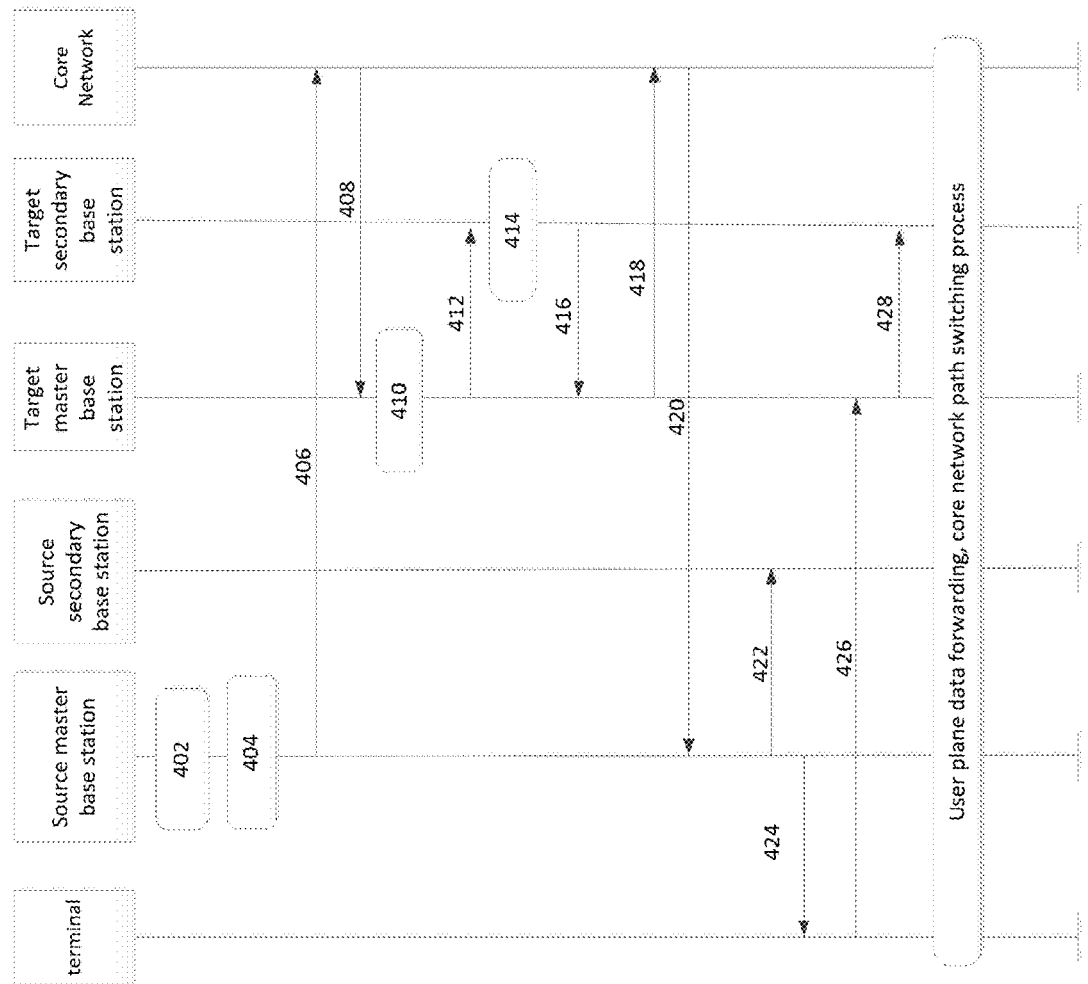
FIG. 4 shows an exemplary change of master base station that is triggered through an indirect interface.

FIG. 4 shows an exemplary change of master base station that is triggered through an indirect interface. The example is applicable when there is no direct interface between the source master base station and the target master base station, or when the core network type changes.

Step 1: The source master base station obtains, at 402, the configuration information of the source secondary base station. The source master base station can obtain the information by sending a message to the source secondary base station. Alternatively, the source secondary base station may send the information to the source master base station when its information changes. The obtained information of the source secondary base station may be in a data structure in one of the following forms: one container, or one container and explicit information elements, or more than one containers, or more than one containers and explicit information elements. The data structure may also include configuration information, some or all, of the source master base station.

Step 2: The source master base station determines, at 404, to trigger a change of base stations. The source master base station transmits, at 406, a change request to the core network. The change request may include the configuration information of the source master base station. The change request may also include the configuration information of the source target base station obtained in Step 1.

In some embodiments, the message may be a handover required message. The information of the source base station and the information of the source secondary base station may be in a data structure in one of the following forms: one container, one container and explicit information elements, multiple containers, or multiple containers and explicit information elements. The configuration information of the secondary base stations includes configuration information of the primary cell (PSCell) and the secondary cell (SCell) under the secondary base stations.

In some embodiments, the secondary cell of the secondary base station is a secondary cell under the Carrier Aggregation (CA) scenario on the secondary base station. The number of the secondary cells is equal to or greater than 0.

In some embodiments, the configuration information of the primary cell includes one or more of the following: carrier configuration information, user plane configuration information, physical resource common configuration information, physical resource specific configuration information, MAC layer configuration information, measurement configuration information, and measurement results.

In some embodiments, the configuration information of the secondary cell includes one or more of the following: carrier configuration information, user plane configuration information, physical resource common configuration information, physical resource specific configuration information, MAC layer configuration information, measurement configuration information, and measurement results.

Step 3: After the core network receives the above-mentioned message and configuration information, the core network transmits, at 408, a message to the target master base station based on an identification of the target master base station included in the message. The message may also include service information, configuration information of the source master base station, and configuration information of the source secondary base station.

In some embodiments, the message may be a handover request message. In some implementations, the information of the source base station and the information of the source secondary base station may be in one of the following forms: one container, one container and explicit information elements, multiple containers, or multiple containers and explicit information elements.

Step 4: After receiving the message and the configuration information from the core network, the target master base station determines, at 410, whether it is necessary to change the secondary base station. If the target master base station determines so, it sends, at 412, a request to a target secondary base station. The request may include the configuration information of target master node. The request may also include the service information and the configuration information of the source secondary base station.

In some embodiments, the request sent by the target master base station is an SN addition request message. In some implementations, the configuration information of target master node and the configuration information of the source secondary base station may be in a data structure in one of the following forms: one container, one container and explicit information elements, multiple containers, or multiple containers and explicit information elements. The data structure may also include some or all configuration information of the source master base station.

Step 5: After receiving the request from the target master base station, the target secondary base station performs, at 414, resource allocations based on the service information in the message. The target secondary base station may compare the configuration information between the target secondary base station and the source secondary base station to generate supplemental configuration information for the target secondary base station.

Step 6: The target secondary base station transmits, at 416, the supplemental configuration information to the target master base station through a response message, indicating that resource allocations are successful for the target secondary base station.

In some embodiments, the response message is an SN addition request acknowledge message. In some implementations, the supplemental configuration information may be in one of the following forms: one container, one container and explicit information elements, multiple containers, or multiple containers and explicit information elements.

Step 7: After receiving the response message, the target master base station transmits, at 418, the configuration information of the target base station and/or the supplemental configuration information of the target secondary base station to the core network via another response message.

In some embodiments, the response message may be a handover request acknowledge message. The configuration information of the target master base station and/or the supplemental configuration information of the target secondary base station may be in a data structure one of the following forms in the response message: one container, one container and explicit information elements, multiple containers, or multiple containers and explicit information elements.

Step 8: After receiving the above message and configuration information, the core network transmits, at 420, a response message to the source master base station. The response message may include the configuration information of the target master base station and/or the supplemental configuration information of the target secondary base station.

In some embodiments, the response message is a handover command message. The configuration information of the target base station and/or the supplemental configuration information of the target secondary base station may be in one of the following forms in the response message: one container, one container and explicit information elements, multiple containers, or multiple containers and explicit information elements.

Step 9: After receiving the response message, the source master base station sends, at 422, a release request message to the source secondary base station to inform the source secondary base station to release resources.

Step 10: The source master base station also transmits, at 424, an air interface configuration message to the terminal to forward the relevant configuration information to the terminal.

Step 11: After the terminal completes the air interface configuration, the random access procedure of the target master base station and the target secondary base station is started and the air interface configuration success message is sent, at 426, to the target master base station.

Step 12: After receiving the response at the target master base station at 428, the target master base station notifies the target secondary base station of the new connection.

Step 13: The network performs user data back-propagation and corresponding core-side upper-layer switching process.

Exemplary Embodiment 3

Figure 5:
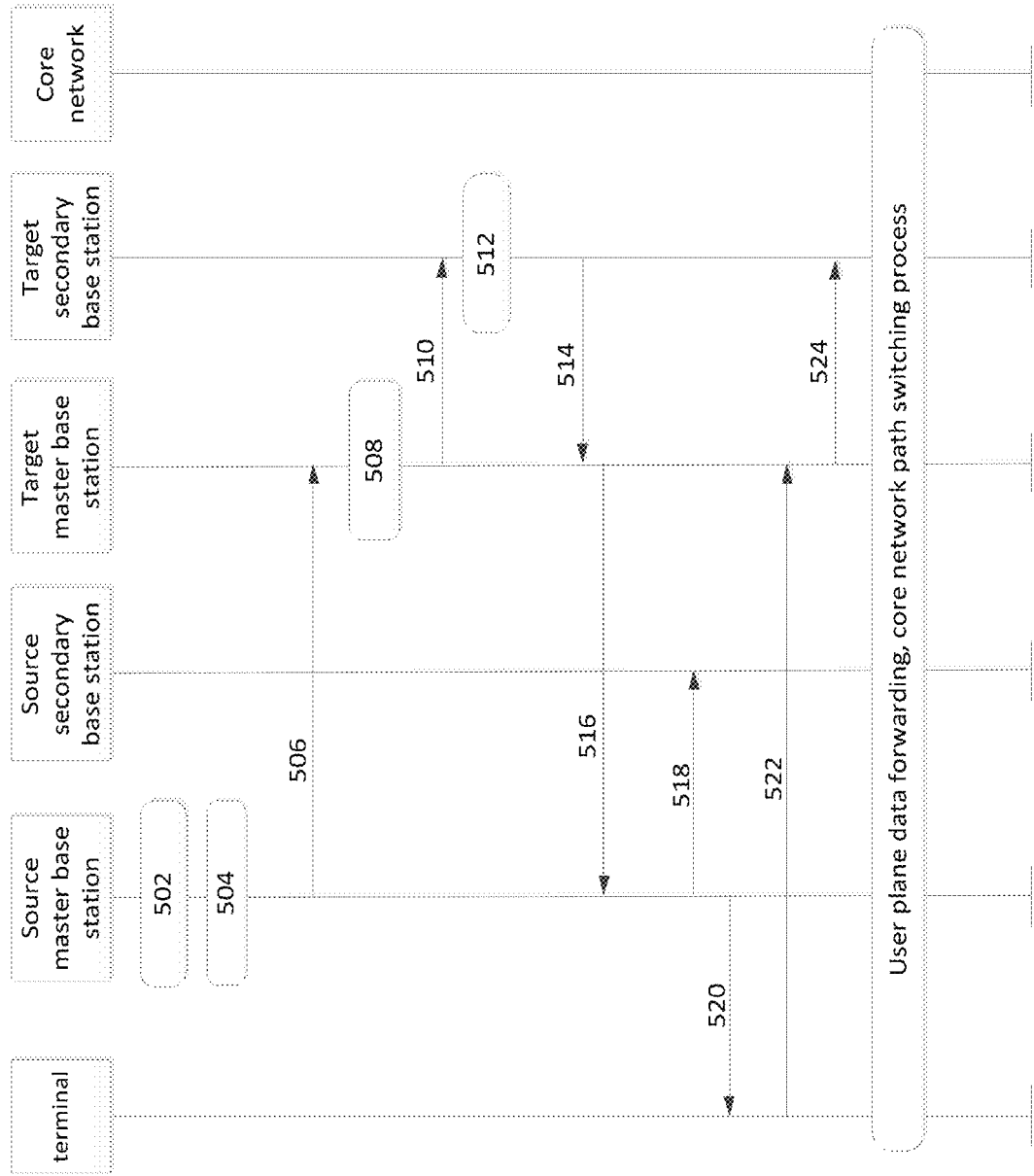
FIG. 5 shows an exemplary change of master base stations with measurement information of transmissions.

FIG. 5 shows an exemplary change of master base stations with measurement information of transmissions.

Step 1: The source master base station obtains, at 502, the configuration information of the source secondary base station. The source master base station can obtain the information by sending a message to the source secondary base station. Alternatively, the source secondary base station may send the information to the source master base station when its information changes. The obtained information of the source secondary base station may be in one of the following forms: one container, one container and explicit information elements, multiple containers, or multiple containers and explicit information elements.

Step 2: The source master base station determines, at 504, to trigger a change of base stations. The source master base station transmits, at 506, a change request to the target master base station. The change request may include the configuration information of the source master base station. The change request may also include the configuration information of the source secondary base station obtained previously. The change request may further include measurement results sent from the terminal to the source master base station.

In some embodiments, the message may be a handover request message. The information of the source base station and the information of the source secondary base station, and the measurement information/results may be in one of the following forms: one container, one container and explicit information elements, multiple containers, or multiple containers and explicit information elements. The configuration information of the secondary base stations includes configuration information of the primary cell (PS-Cell) and the secondary cell (SCell) under the secondary base stations.

In some embodiments, the secondary cell of a secondary base station is a secondary cell under the Carrier Aggregation (CA) scenario on the secondary base station. The number of the secondary cells is equal to or greater than 0.

In some embodiments, the configuration information of the primary cell includes one or more of the following: carrier configuration information, user plane configuration information, physical resource common configuration information, physical resource specific configuration information, MAC layer configuration information, measurement configuration information, and measurement results.

In some embodiments, the configuration information of the secondary cell includes one or more of the following: carrier configuration information, user plane configuration information, physical resource common configuration information, physical resource specific configuration information, MAC layer configuration information, measurement configuration information, and measurement results.

Step 3: After receiving the message and the configuration information, the target master base station determines, at 508, whether it is necessary to change the secondary base station based on the measurement information and/or measurement results included in the message. If the target master base station determines so, it transmits, at 510, a request to a target secondary base station. The request may include the configuration information of target master node. The request may also include service information and the configuration information of the source secondary base station. The request may also include measurement information and/or measurement results.

In some embodiments, the request sent by the target master base station is an SN addition request message. In some implementations, the configuration information of target master node, the configuration information of the source secondary base station and the measurement information and/or measurement results may be in one of the following forms: one container, one container and explicit information elements, multiple containers, or multiple containers and explicit information elements.

Step 4: After receiving the request from the target master base station, the target secondary base station selects, at 512, the target primary cell based on the measurement information and/or measurement results, and performs resource allocations based on the service information included in the message. The target secondary base station may compare the configuration information between the target secondary base station and the source secondary base station to generate supplemental configuration information for the target secondary base station.

Step 5: The target secondary base station transmits, at 514, the supplemental configuration information to the target master base station through a response message, indicating that resource allocations are successful for the target secondary base station.

In some embodiments, the response message is an SN addition request acknowledge message. In some implementations, the configuration information may be in one of the following forms: one container, one container and explicit information elements, multiple containers, or multiple containers and explicit information elements.

Step 6: After receiving the response message, the target master base station transmits, at 316, the configuration information of the target master base station and/or the supplemental configuration information of the target secondary base station to the source master base station via a response message.

In some embodiments, the response message may be a handover request acknowledge message. The configuration information of the target master base station and/or the supplemental configuration information of the target secondary base station may be in one of the following forms in the response message: one container, one container and explicit information elements, multiple containers, or multiple containers and explicit information elements.

Step 7: After receiving the response message, the source master base station sends, at 518, a release request message to the source secondary base station to inform the source secondary base station to release resources.

Step 8: The source master base station also transmits, at 520, an air interface configuration message to the terminal to forward the relevant configuration information to the terminal.

Step 9: After the terminal completes the air interface configuration, the random access procedure of the target master station and the target secondary base station is started and the air interface configuration success message is sent, at 522, to the target master base station.

Step 10: After receiving the response at the target master base station at 524, the target master base station notifies the target secondary base station of the new connection.

Step 11: The network performs user data back-propagation and corresponding core-side upper-layer switching process.

Exemplary Embodiment 4

Figure 6:
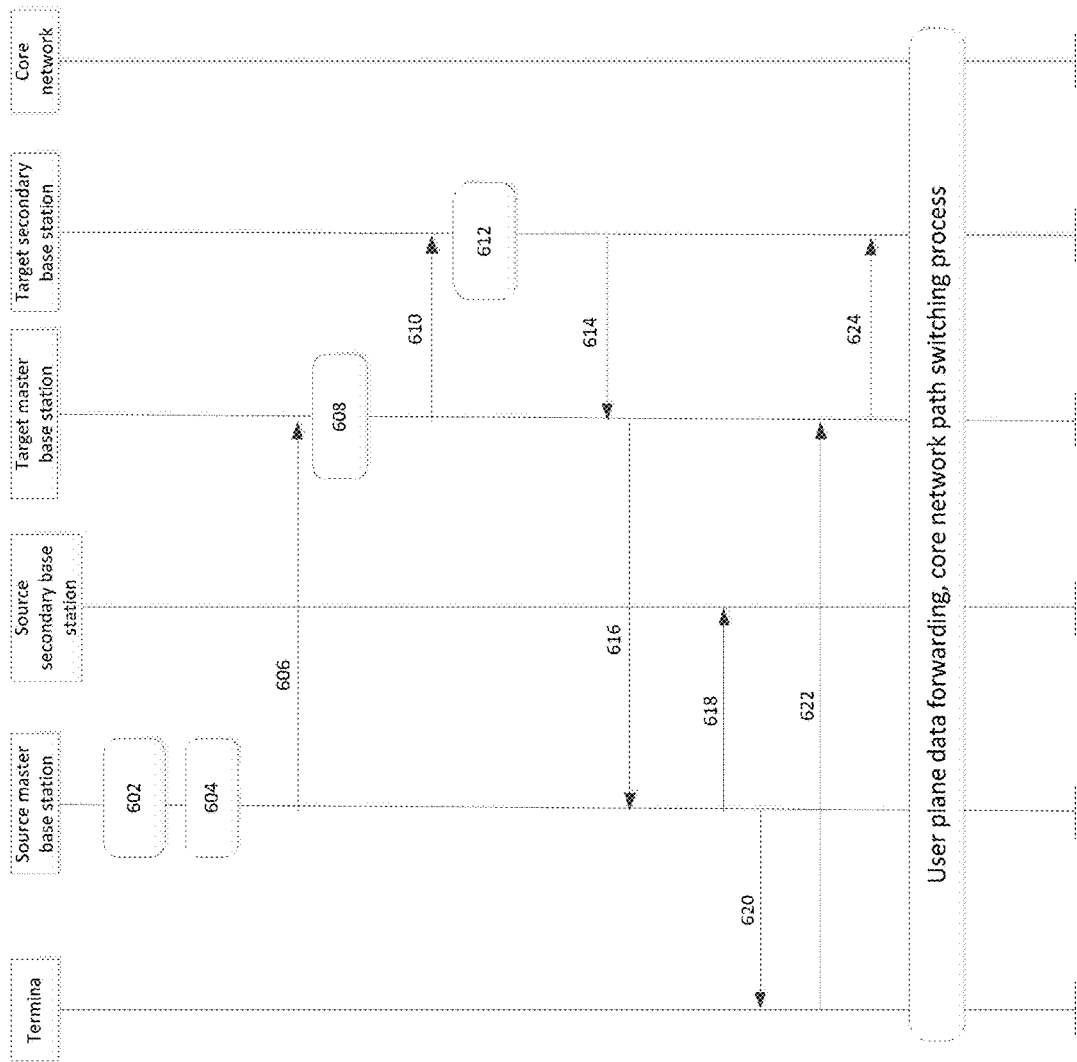
FIG. 6 shows another exemplary change of master base stations with measurement information of transmissions.

FIG. 6 shows another exemplary change of master base stations with measurement information of transmissions.

Step 1: The source master base station obtains, at 602, the configuration information and measurement information/results of the source secondary base station. The source master base station can obtain the information by sending a message to the source secondary base station. Alternatively, the source secondary base station may send the information to the source master base station when its information changes. The obtained configuration information and measurement information/results of the source secondary base station may be in one of the following forms: one container, one container and explicit information elements, multiple containers, or multiple containers and explicit information elements.

Step 2: The source master base station determines, at 604, to trigger a change of base stations. The source master base station transmits, at 606, a change request to the target master base station. The change request may include the configuration information of the source master base station. The change request may also include the configuration information of the source secondary base station obtained previously. The change request may further include measurement information/results of the source secondary base station obtained previously. The change request may further include measurement results sent from the terminal to the source master base station.

In some embodiments, the message may be a handover request message. The information of the source base station and the information of the source secondary base station, and the measurement information/results may be in one of the following forms: one container, or one container and explicit information elements, multiple containers, or multiple containers and explicit information elements. The configuration information of the secondary base stations includes configuration information of the primary cell (PS-Cell) and the secondary cell (SCell) under the secondary base stations.

In some embodiments, the secondary cell of a secondary base station is a secondary cell under the Carrier Aggregation (CA) scenario on the secondary base station. The number of the secondary cells is equal to or greater than 0.

In some embodiments, the configuration information of the primary cell includes one or more of the following: carrier configuration information, user plane configuration information, physical resource common configuration information, physical resource specific configuration information, MAC layer configuration information, measurement configuration information, and measurement results.

In some embodiments, the configuration information of the secondary cell includes one or more of the following: carrier configuration information, user plane configuration information, physical resource common configuration information, physical resource specific configuration information, MAC layer configuration information, measurement configuration information, and measurement results.

Step 3: After receiving the message and the configuration information, the target master base station determines, at 608, whether it is necessary to change the secondary base station based on the measurement information/results of the source secondary base station included in the message. If the target master base station determines so, it transmits, at 610, a request to a target secondary base station. The request may include the configuration information of target master node. The request may also include service information and the configuration information of the source secondary base station. The request may also include measurement information and/or measurement results.

In some embodiments, the request sent by the target master base station is an SN addition request message. In some implementations, the configuration information of target master node, the configuration information of the source secondary base station and the measurement information and/or measurement results may be in one of the following forms: one container, one container and explicit information elements, multiple containers, or multiple containers and explicit information elements.

Step 4: After receiving the request from the target master base station, the target secondary base station selects, at 612, the target primary cell based on the measurement information and/or measurement results, and performs resource allocations based on the service information included in the message. The target secondary base station may compare the configuration information between the target secondary base station and the source secondary base station to generate supplemental configuration information for the target secondary base station.

Step 5: The target secondary base station transmits, at 614, the supplemental configuration information to the target master base station through a response message, indicating that resource allocations are successful for the target secondary base station.

In some embodiments, the response message is an SN addition request acknowledge message. In some implementations, the configuration information may be in one of the following forms: one container, one container and explicit information elements, multiple containers, or multiple containers and explicit information elements.

Step 6: After receiving the response message, the target master base station transmits, at 616, the configuration information of the target master base station and/or the supplemental configuration information of the target secondary base station to the source master base station via a response message.

In some embodiments, the response message may be a handover request acknowledge message. The configuration information of the target master base station and/or the supplemental configuration information of the target secondary base station may be in one of the following forms in the response message: one container, or one container and explicit information elements, multiple containers, or multiple containers and explicit information elements.

Step 7: After receiving the response message, the source master base station sends, at 618, a release request message to the source secondary base station to inform the source secondary base station to release resources.

Step 8: The source master base station also transmits, at 620, an air interface configuration message to the terminal to forward the relevant configuration information to the terminal.

Step 9: After the terminal completes the air interface configuration, the random access procedure of the target master station and the target secondary base station is started and the air interface configuration success message is sent, at 622, to the target master base station.

Step 10: After receiving the response at the target master base station at 624, the target master base station notifies the target secondary base station of the new connection.

Step 11: The network performs user data back-propagation and corresponding core-side upper-layer switching process.

In the various message exchange scenarios described in the present document, in some embodiments, when a source master base station sends configuration information to a target master base station, it may send information of the source master base station and information of the source secondary base station. In some embodiments, when the target master base station sends configuration information to the target secondary base station, that information may also include information of the target master base station, and information of the source secondary base station.

Figure 8:
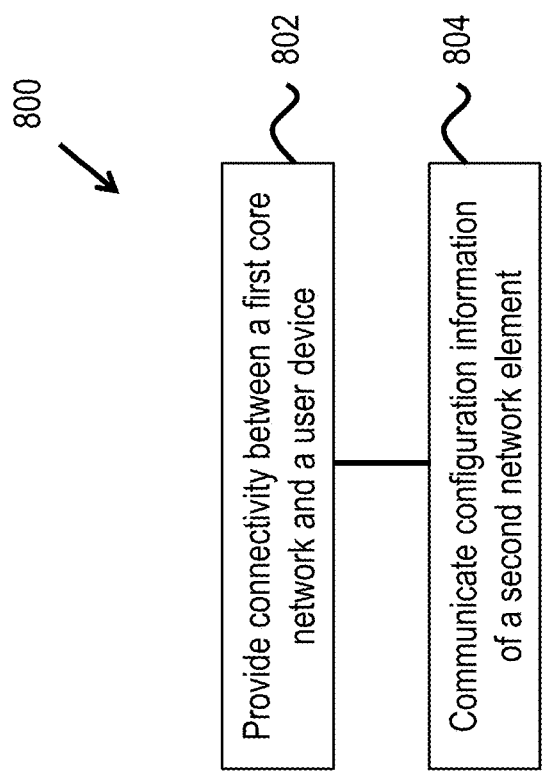
FIG. 8 is a flowchart representation of an exemplary method of wireless communication.

FIG. 8 is a flowchart representation of an exemplary method of wireless communication 800. The method 800 includes, at 802, providing connectivity between a first core network and a user device. The method 800 also includes, at 804, communicating configuration information of a second network element.

In some embodiments, the method includes operating a first network element in a wireless communication network to provide connectivity between a first core network and a user device, wherein the wireless communication network includes a second network element that is configured to provide a secondary connectivity between the first core network and the user device; and communicating, by the first network element, in a handover to a third network element configured to provide connectivity with a second core network, configuration information of the second network element to the third network element.

Figure 9:
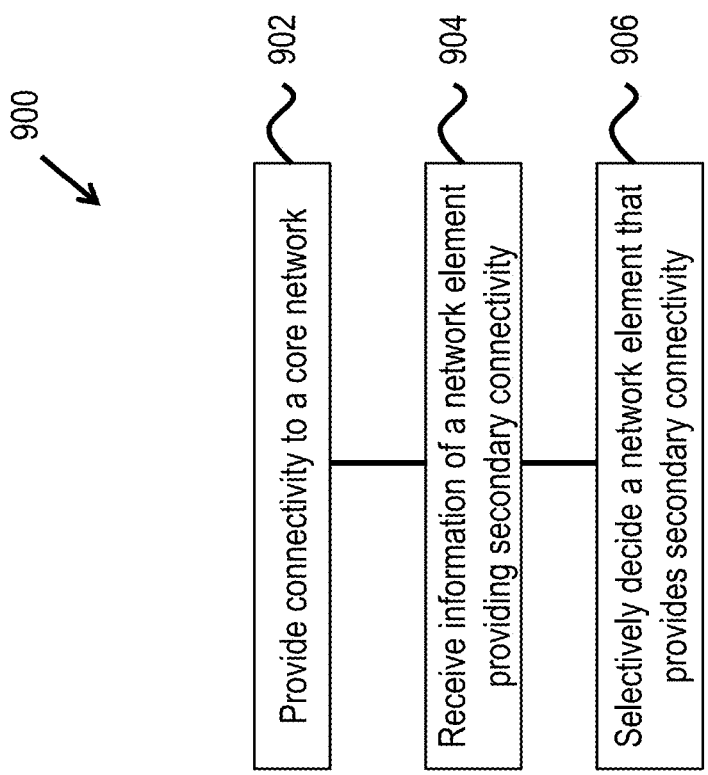
FIG. 9 is another flowchart representation of an exemplary method of wireless communication.

FIG. 9 is another flowchart representation of an exemplary method of wireless communication 900. The method 900 includes, at 902, providing connectivity to a core network; at 904, receiving information of a network element providing secondary connectivity; and at 906, selectively deciding a network element that provides secondary connectivity.

In some embodiments, the method includes operating a first network element to provide connectivity to a first core network; receiving, when a user device is handed over from a second network element, information from the second network element providing connectivity to a second core network, wherein the information identifies properties of a third network element providing a secondary connectivity to the second core network; and selectively deciding, based on the information, a secondary connectivity network element between the third network element and a fourth network element for the first network element, wherein the fourth network element is configured to provide connectivity to the first core network.

Figure 10:
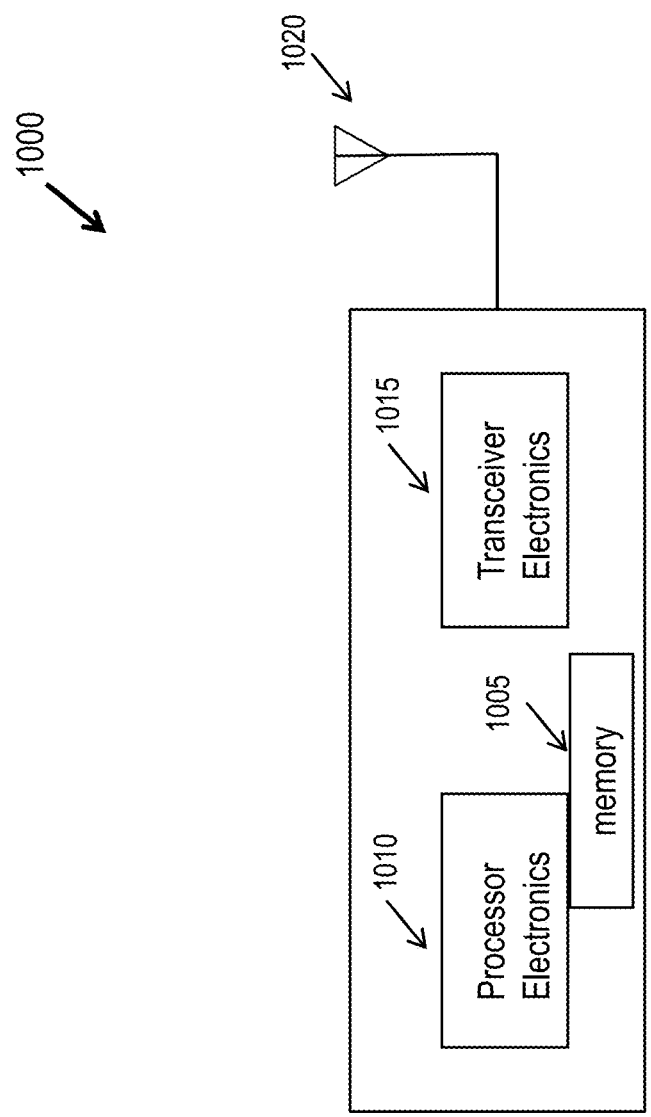
FIG. 10 is a block diagram of an example of a wireless communication apparatus.

FIG. 10 is a block diagram of an example of a wireless communication apparatus. The apparatus 1000, such as a base station or a wireless device (or a terminal), can include processor electronics 1010 such as a microprocessor that implements one or more of the wireless techniques presented in this document. The apparatus 1000 can include transceiver electronics 1015 to send and/or receive wireless signals over one or more communication interfaces such as antenna 1020. The apparatus 1000 can include other communication interfaces for transmitting and receiving data. The apparatus 1000 can include one or more memories 1005 configured to store information such as data and/or instructions. In some implementations, the processor electronics 1010 can include at least a portion of the transceiver electronics 1015. In some embodiments, at least some of the disclosed techniques, modules or functions are implemented using the apparatus 1000.

Figure 11:
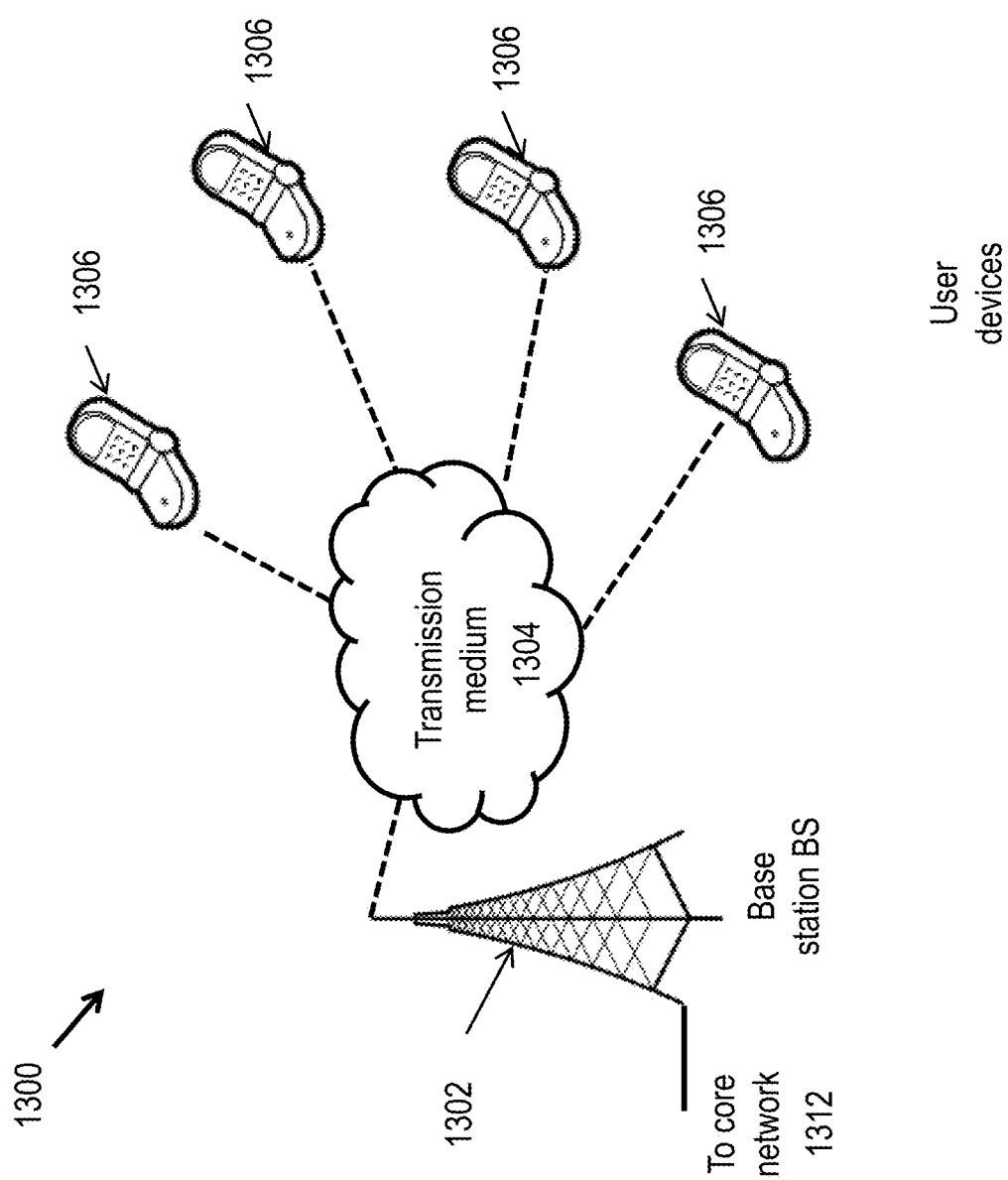
FIG. 11 shows an example of wireless communications network where techniques in accordance with one or more embodiments of the present technology can be applied.

FIG. 11 shows an example of wireless communications network where techniques in accordance with one or more embodiments of the present technology can be applied. A wireless communication system 1300 can include one or more base stations (BSs) 1302, one or more wireless devices 1306, and a core network 1312. The base station 1302 can provide wireless service to wireless devices 1306 in one or more wireless sectors. In some implementations, a base station 1302 includes directional antennas to produce two or more directional beams to provide wireless coverage in different sectors.

The core network 1312 provides connectivity with other wireless communication systems and wired communication systems. The core network may include one or more service subscription databases to store information related to the subscribed wireless devices 1306. A first base station can provide wireless service based on a first radio access technology, whereas a second base station can provide wireless service based on a second radio access technology. The base stations may be co-located or may be separately installed in the field according to the deployment scenario.

In some implementations, a wireless communication system can include multiple networks using different wireless technologies. A dual-mode or multi-mode wireless device includes two or more wireless technologies that could be used to connect to different wireless networks.

It is thus evident that the techniques disclosed in the present document provide a method and an apparatus for configuring transmission for supporting simultaneous change of the master and secondary base stations. The target secondary base station is also capable of obtaining information regarding the source secondary base station without a full re-configuration of the air interface, thereby avoiding user data packet loss and maintaining good user experiences.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
operating a target master network element using a first radio access technology (RAT) in a wireless communication network to provide connectivity to a first core network;
receiving, by the target master network element in a handover of a user device from a source master network element that provides connectivity between the user device and a second core network, information from the source master network element identifying properties of a source secondary network element using a second RAT that provides a secondary connectivity between the user device and the second core network, wherein the information of the source secondary network element is transmitted using multiple containers, and wherein the information comprises user plane configuration information, physical resource configuration information, and Medium Access Control (MAC) layer configuration of at least one cell under the source secondary network element, wherein the at least one cell comprises a primary cell or a secondary cell; and
selectively changing, in part based on the information that identifies properties of the source secondary network element, from the source secondary network element to a target secondary network element that operates using the second RAT.

2. The method of claim 1, wherein the target secondary network element comprises a newly selected network element, the method further comprising transmitting the information of the source secondary network element to the newly selected network element.

3. The method of claim 1, wherein the first core network and the second core network are the same core network.

4. The method of claim 1, wherein the first core network and the second core network are different core networks.

5. The method of claim 1, wherein the first RAT is a fourth generation (4G) RAT technology.

6. The method of claim 1, wherein the first RAT is a fifth generation (5G) RAT technology.

7. A wireless communication apparatus comprising:
a processor; and
a memory including processor-executable instructions stored thereon, the processor-executable instructions upon execution by the processor configures the processor to:
operate in a wireless communication network using a first radio access technology (RAT) as a target master network element to provide connectivity to a first core network;
receive, in a handover of a user device from a source master network element that provides connectivity between the user device and a second core network, information from the source master network element identifying properties of a source secondary network element using a second RAT that provides a secondary connectivity between the user device and the second core network, wherein the information of the source secondary network element is transmitted using multiple containers, and wherein the information comprises user plane configuration information, physical resource configuration information, and Medium Access Control (MAC) layer configuration of at least one cell under the source secondary network element, wherein the at least one cell comprises a primary cell or a secondary cell; and
selectively change, in part based on the information that identifies properties of the source secondary network element, from the source secondary network element to a target secondary network element that operates using the second RAT.

8. The apparatus of claim 7, wherein the target secondary network element comprises a newly selected network element, the processor is further configured to transmit the information of the source secondary network element to the newly selected network element.

9. The apparatus of claim 7, wherein the first core network and the second core network are the same core network.

10. The apparatus of claim 7, wherein the first core network and the second core network are different core networks.

11. The apparatus of claim 7, wherein the first RAT is a fourth generation (4G) RAT technology.

12. The apparatus of claim 7, wherein the first RAT is a fifth generation (5G) RAT technology.

13. A non-transitory computer-readable program medium having code to implement a method that comprises:
   operating a target master network element using a first radio access technology (RAT) in a wireless communication network to provide connectivity to a first core network;
   receiving, by the target master network element in a handover of a user device from a source master network element that provides connectivity between the user device and a second core network, information from the source master network element identifying properties of a source secondary network element using a second RAT that provides a secondary connectivity between the user device and the second core network, wherein the information of the source secondary network element is transmitted using multiple containers, and wherein the information comprises user plane configuration information, physical resource configuration information, and Medium Access Control (MAC) layer configuration of at least one cell under the source secondary network element, wherein the at least one cell comprises a primary cell or a secondary cell; and
   selectively changing, in part based on the information that identifies properties of the source secondary network element, from the source secondary network element to a target secondary network element that operates using the second RAT.

14. The non-transitory computer-readable program medium of claim 13, wherein the target secondary network element comprises a newly selected network element, the method further comprising transmitting the information of the source secondary network element to the newly selected network element.

15. The non-transitory computer-readable program medium of claim 13, wherein the first core network and the second core network are the same core network.

16. The non-transitory computer-readable program medium of claim 13, wherein the first core network and the second core network are different core networks.

17. The non-transitory computer-readable program medium of claim 13, wherein the first RAT is a fourth generation (4G) RAT technology.

18. The non-transitory computer-readable program medium of claim 13, wherein the first RAT is a fifth generation (5G) RAT technology.

* * * * *